US011881660B2

(12) United States Patent
Turner et al.

(10) Patent No.: US 11,881,660 B2
(45) Date of Patent: *Jan. 23, 2024

(54) ELECTRICAL SOCKET SYSTEM AND METHOD

(71) Applicant: Honeywell International Inc., Charlotte, NC (US)

(72) Inventors: Keith Turner, Charlotte, NC (US); Neil Brown, Charlotte, NC (US); Jason Yu, Charlotte, NC (US); Rick Fang, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/090,874

(22) Filed: Dec. 29, 2022

(65) Prior Publication Data

US 2023/0140911 A1 May 11, 2023

Related U.S. Application Data

(63) Continuation of application No. 17/443,282, filed on Jul. 23, 2021, now Pat. No. 11,569,621.

(51) Int. Cl.
*H01R 13/00* (2006.01)
*H01R 13/66* (2006.01)
(Continued)

(52) U.S. Cl.
CPC .......... *H01R 13/6691* (2013.01); *G08B 7/06* (2013.01); *G08B 21/182* (2013.01); *H01R 13/6683* (2013.01)

(58) Field of Classification Search
CPC ................. G08B 29/181; G08B 13/04; G08B 13/19682; G08B 17/10; G08B 25/008; G08B 25/14; G08B 13/191; G06N 20/00
See application file for complete search history.

(56) References Cited

U.S. PATENT DOCUMENTS 4,412,284 A 10/1983 Kerforne et al.
5,793,125 A 8/1998 Tarng
(Continued)

FOREIGN PATENT DOCUMENTS

CN 201927858 U 8/2011
CN 102891410 A * 1/2013
(Continued)

OTHER PUBLICATIONS

SB Search Report, GB Application No. GB2101308.1, dated Jul. 23, 2021 (7 pages).

*Primary Examiner* — Ojiako K Nwugo
(74) *Attorney, Agent, or Firm* — Seager, Tufte & Wickhem, LLP

(57) ABSTRACT

According to an aspect, there is provided an electrical socket system comprising: an electrical socket comprising at least one temperature sensor; and a controller configured to monitor a temperature sensed by the temperature sensor, wherein the controller is configured to: determine a temperature gradient of the temperature with respect to time; determine if the temperature gradient exceeds a threshold gradient value; and trigger an alarm event if it is determined that the temperature gradient exceeds the threshold gradient value.

22 Claims, 6 Drawing Sheets

(51) Int. Cl.
*G08B 7/06* (2006.01)
*G08B 21/18* (2006.01)

(56) References Cited

U.S. PATENT DOCUMENTS

| | | | | |
|---|---|---|---|---|
| 6,078,970 | A | 6/2000 | Nordstrom et al. | |
| 6,222,714 | B1 | 4/2001 | Hoffman | |
| 8,467,734 | B2 | 6/2013 | Schubert | |
| 2006/0161373 | A1 | 7/2006 | Mangrulkar et al. | |
| 2007/0121512 | A1 | 5/2007 | Schibli et al. | |
| 2008/0173629 | A1 | 7/2008 | Deibel et al. | |
| 2009/0015356 | A1 | 1/2009 | Chen | |
| 2009/0315409 | A1* | 12/2009 | Wheeler | H02H 3/42 307/126 |
| 2011/0196634 | A1 | 8/2011 | Kemp et al. | |
| 2013/0148248 | A1* | 6/2013 | Zhou | H02H 5/042 361/103 |
| 2014/0077821 | A1 | 3/2014 | Reed et al. | |
| 2015/0262468 | A1* | 9/2015 | Yang | G01K 3/005 340/595 |
| 2016/0195435 | A1* | 7/2016 | Krueger | H01R 13/6683 374/184 |
| 2020/0136374 | A1 | 4/2020 | Hagerman | |
| 2020/0343675 | A1* | 10/2020 | Wolf | B60L 53/302 |
| 2020/0359605 | A1* | 11/2020 | Maher | A01K 27/009 |
| 2021/0057205 | A1 | 2/2021 | Riepe et al. | |
| 2021/0184409 | A1* | 6/2021 | Li | H01R 13/7175 |

FOREIGN PATENT DOCUMENTS

| | | | | |
|---|---|---|---|---|
| CN | 102891410 | A | 1/2013 | |
| CN | 106299896 | A | 1/2017 | |
| CN | 110014930 | A | 7/2019 | |
| GB | 2504967 | A | 2/2014 | |
| GB | 2599142 | A | 3/2022 | |
| JP | 2013004394 | A | 1/2013 | |
| JP | 2018132318 | A | 8/2018 | |
| WO | 2019141629 | A1 | 7/2019 | |
| WO | WO-2019141629 | A1 * | 7/2019 | B60L 3/04 |
| WO | 2018222695 | A1 | 1/2020 | |
| WO | 2020016570 | A1 | 1/2020 | |

* cited by examiner

ELECTRICAL SOCKET SYSTEM AND METHOD

CROSS-REFERENCE TO RELATED APPLICATIONS

This is a continuation application of co-pending U.S. patent application Ser. No. 17/443,282, filed on Jul. 23, 2021, which claims priority pursuant to 35 U.S.C. 119(a) to United Kingdom Patent Application No. 2101308.1, filed Jan. 29, 2021, both of which are incorporated herein by reference.

FIELD OF THE INVENTION

The present disclosure relates to an electrical socket system and method, and particularly, although not exclusively, relates to an electrical socket system and method in which a temperature gradient is monitored and used to trigger an alarm event.

BACKGROUND OF THE INVENTION

Traditional smoke detectors are well known and widely used. However, a traditional smoke detector detects smoke and thus only triggers an alarm after a fire has started. It is desirable to minimise any delay in triggering a fire alarm to maximise the time for the occupants to evacuate, particularly for a large building with many occupants. Likewise, it is desirable to minimise false positives as these can be highly disruptive and costly. The present disclosure seeks to address these issues.

SUMMARY OF THE INVENTION

According to a first specific aspect, there is provided an electrical socket system comprising:

- an electrical socket comprising at least one temperature sensor; and
- a controller configured to monitor a temperature sensed by the temperature sensor. The controller may be configured to:
- determine a temperature gradient of the temperature with respect to time;
- determine if the temperature gradient exceeds a threshold gradient value; and
- trigger an alarm event if it is determined that the temperature gradient exceeds the threshold gradient value.

The threshold gradient value may be variable. The threshold gradient value may have a default, e.g. initial, value, which may be varied. The default threshold gradient value may be varied after installation of the electrical socket, e.g. depending on at least one sensed parameter.

The controller may be configured to receive power usage data for the electrical socket. The controller may be configured to adjust the threshold gradient value for the electrical socket depending on the power usage data for the electrical socket. The controller may be configured to increase the threshold gradient value for the electrical socket if the electrical socket has a power usage that exceeds a threshold power value. The power usage data may comprise present and/or historical power usage data. The power usage data may relate to a particular electrical socket and the threshold gradient value may be adjusted for that particular electrical socket.

The controller may be configured to receive data relating to ambient conditions, such as temperature, pressure, humidity and/or any other ambient parameter. The ambient conditions may relate to atmospheric conditions for the electrical socket, which may be within a room or outside a building. The controller may be configured to adjust the threshold gradient value depending on the data relating to ambient conditions.

The controller may comprise a machine learning (or artificial intelligence) algorithm. The machine learning algorithm may be configured to adjust the threshold gradient value for the electrical socket (e.g. a particular electrical socket of a plurality of electrical sockets) based on at least one detected electrical power parameter of the electrical socket, data relating to ambient conditions and/or time of day. For example, the machine learning algorithm may use time of day data, e.g. to determine that power usage is typically high for a particular electrical socket at a particular time of day. The machine learning algorithm may adjust (e.g. increase) the threshold gradient value for the particular electrical socket at the particular time of day when power usage is known to be high.

The machine learning algorithm may be configured to minimise false determinations of an alarm event. The machine learning algorithm may receive data regarding false positives so that the machine learning algorithm may adjust the threshold gradient values to minimise false positives.

The electrical socket may be configured to measure at least one electrical power parameter. The at least one electrical power parameter may comprise at least one of electrical power, current, frequency and power factor. The threshold gradient value may vary depending on at least one of the electrical power parameters.

The electrical socket system may comprise a plurality of electrical sockets. The controller may monitor the temperature and temperature gradient of each electrical socket. The controller may determine if one of the electrical sockets has a temperature gradient that exceeds the threshold gradient value, e.g. for that particular electrical socket. The threshold gradient value may be different for different electrical sockets.

The electrical socket may comprise at least two temperature sensors. In particular, the electrical socket may comprise at least three temperature sensors. For example, the electrical socket may comprise four temperature sensors. Having multiple temperature sensors may provide some redundancy and/or verification of the sensed data. For example, having at least three temperature sensors may allow the system to identify a faulty temperature sensor.

The temperature sensors may be located at or near known arc points within the electrical socket. The temperature sensors may be mounted on a printed circuit board of the electrical socket. The temperature sensors may be distributed around the printed circuit board. The temperature sensors may be provided on one or both sides of the printed circuit board.

The electrical socket and controller may be coupled together. Alternatively, the controller may be separate from the electrical socket.

The electrical socket system may comprise a plurality of electrical sockets and each electrical socket may be operatively coupled to a hub. The electrical sockets may be coupled to the hub wirelessly (e.g. via Bluetooth, Wi-Fi, or any other wireless protocol) or via a wired connection (e.g. ethernet, powerline network or any other wired connection). The hub may comprise the controller. The hub may form part of or may be operatively coupled to a building management system. The building management system may comprise the controller.

The electrical socket may comprise at least one warning device configured to emit a warning sound and/or light when it is determined that the temperature gradient exceeds the threshold gradient value. A particular one of the electrical sockets (e.g. that has a temperature gradient that exceeds the threshold gradient value) may emit the warning or all electrical sockets (e.g. within a particular zone) may emit the warning.

According to a second specific aspect, there is provided a method for an electrical socket comprising at least one temperature sensor, the method comprising monitoring a temperature sensed by the temperature sensor.

The method may further comprise:

determining a temperature gradient of the temperature with respect to time;

determining if the temperature gradient exceeds a threshold gradient value; and triggering an alarm event if it is determined that the temperature gradient exceeds the threshold gradient value.

The method may further comprise adjusting the threshold gradient value based on power usage data for the electrical socket.

The method may further comprise adjusting the threshold gradient value depending on data relating to ambient conditions.

The method may further comprise applying a machine learning algorithm to adjust the threshold gradient value for the electrical socket based on at least one detected electrical power parameter of the electrical socket and/or data relating to ambient conditions.

Other features descried in respect of the first specific aspect may apply to the second specific aspect.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

With reference to FIGS. 1 to 4, the present disclosure relates to an electrical socket system 10 comprising at least one electrical outlet or socket 20. The electrical socket 20 may receive a standard plug of an electrical appliance.

Figure 1:
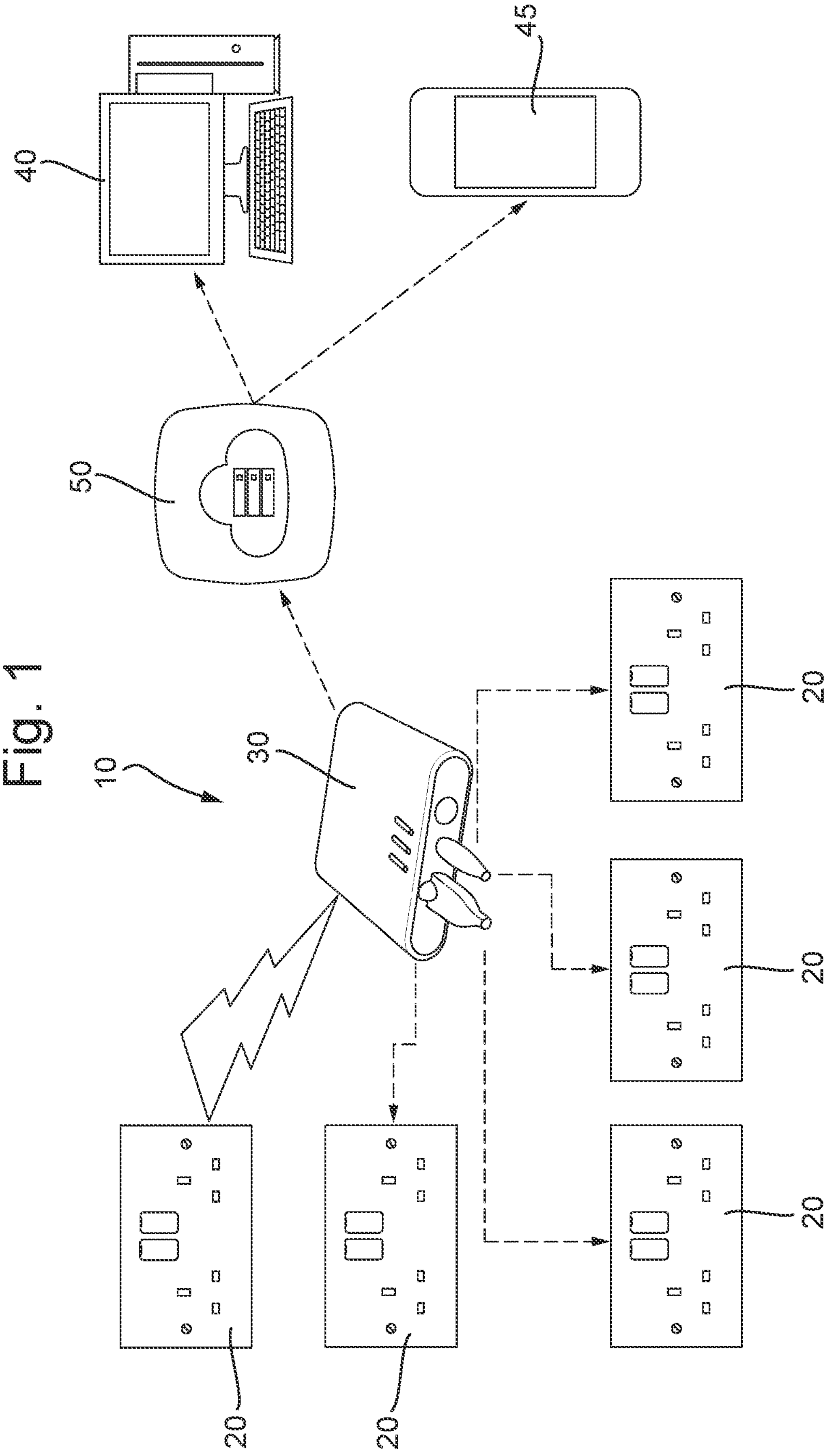
FIG. 1 is a schematic block diagram depicting an electrical socket system according to an example of the present disclosure.

As depicted in FIG. 1, a plurality of electrical sockets 20 may be provided. The or each of the electrical sockets 20 may be operatively coupled to a hub 30. The hub 30 may collect data from and send data to the electrical socket(s) 20. The hub 30 may thus provide an interface to the electrical socket(s) and may manage the flow of data. The electrical socket(s) 20 may be coupled to the hub 30 wirelessly (e.g. via Bluetooth, Wi-Fi, or any other wireless protocol) or via a wired connection (e.g. ethernet, powerline network or any other wired connection).

The hub 30 may form part of or may be operatively coupled to a building management system 40. The building management system 40 may be connected to a cloud server 50. For example, the hub 30 and building management system 40 may be connected to one another via the cloud server 50. The building management system 40 may otherwise connected directly to the hub 30 or may comprise the hub 30. Other devices, such as a mobile device 45 (e.g. a mobile phone, tablet or any other mobile device), may connect to the building management system 40, e.g. via the cloud server 50. The mobile device 45 may provide remote access to the building management system 40, e.g. to provide or view building management data or instructions. Additionally or alternatively, as will be described below, the mobile device 45 may connect directly to the hub 30 or electrical socket 20.

Figure 2:
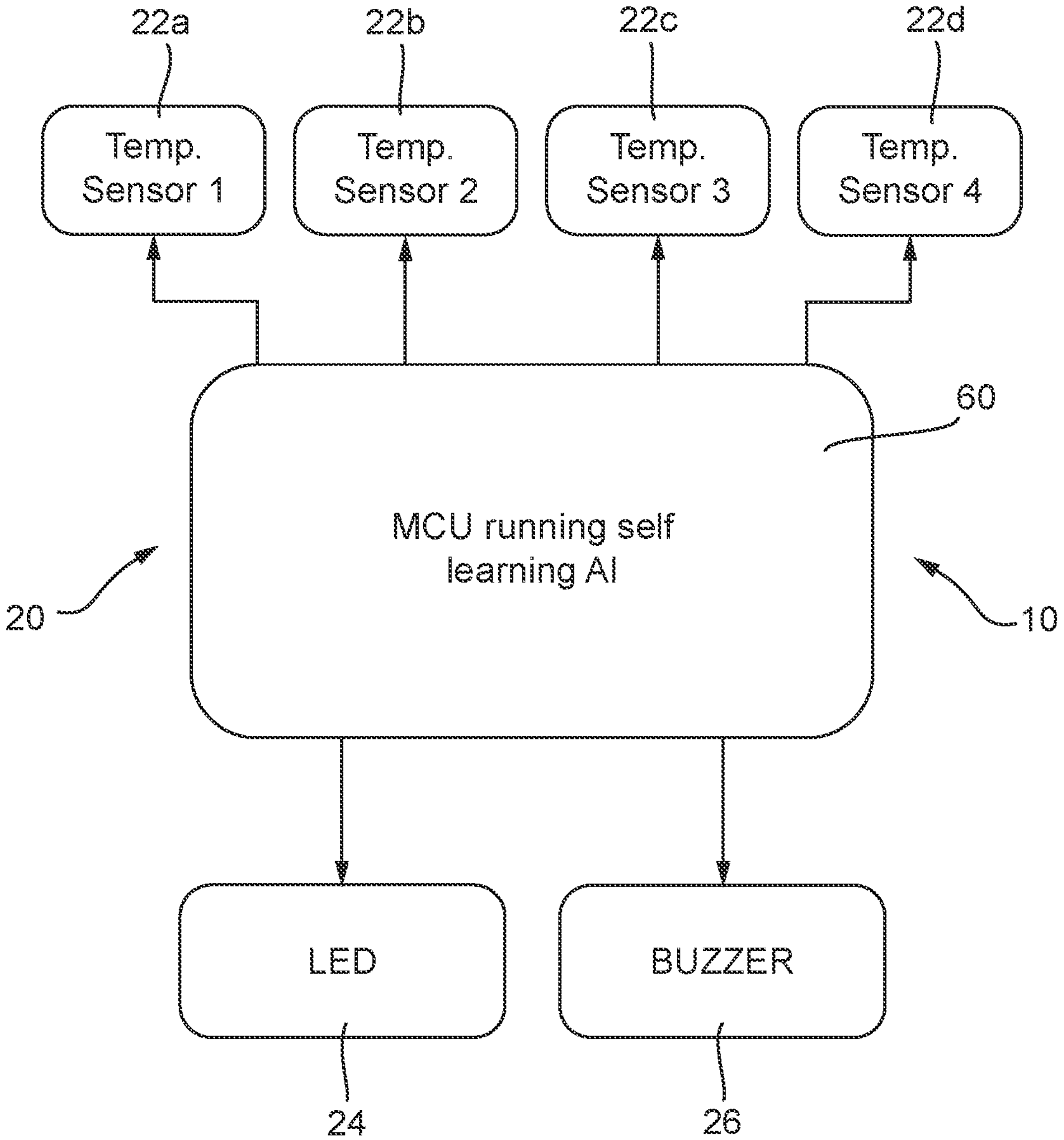
FIG. 2 is another schematic block diagram depicting an electrical socket system according to an example of the present disclosure.

With reference to FIG. 2, the or each electrical socket 20 comprises at least one temperature sensor 22*a*-22*d* configured to detect a temperature of the electrical socket 20. The temperature sensor(s) 22*a*-22*d* may comprise a thermistor. The electrical socket system 10 further comprises a controller 60 configured to monitor the temperature sensed by the temperature sensor 22*a*-22*d*. The electrical socket 20 and controller 60 may be coupled together. For example, the electrical socket 20 and controller 60 may be provided as single unit. As such, each electrical socket 20 may have a dedicated controller 60. Alternatively, the controller 60 may be separate from the electrical socket 20. For example, the hub 30 or building management system 40 may comprise the controller 60. As such, a single controller 60 may control a plurality of electrical sockets 20.

Referring still to FIG. 2, the or each electrical socket 20 may comprise at least one warning device. In the example shown, the electrical socket 20 comprises a light emitting device 24, such as an LED light, and/or a sound emitting device 26, such as a buzzer. The controller 60 is operatively coupled to the light emitting device 24 and/or sound emitting device 26. The controller 60 controls the light and/or sound emitting devices 24, 26 to emit a warning based on the temperature sensed by the temperature sensor 22*a*-22*d*.

Figure 3:
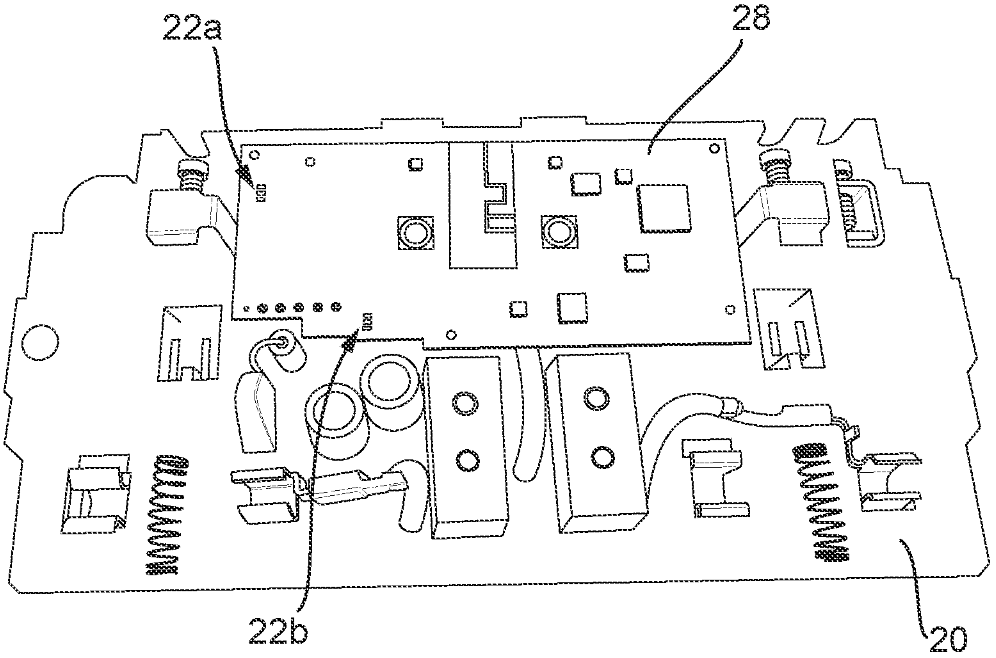
FIG. 3 is a view of an electrical socket according to an example of the present disclosure.
Figure 4A:
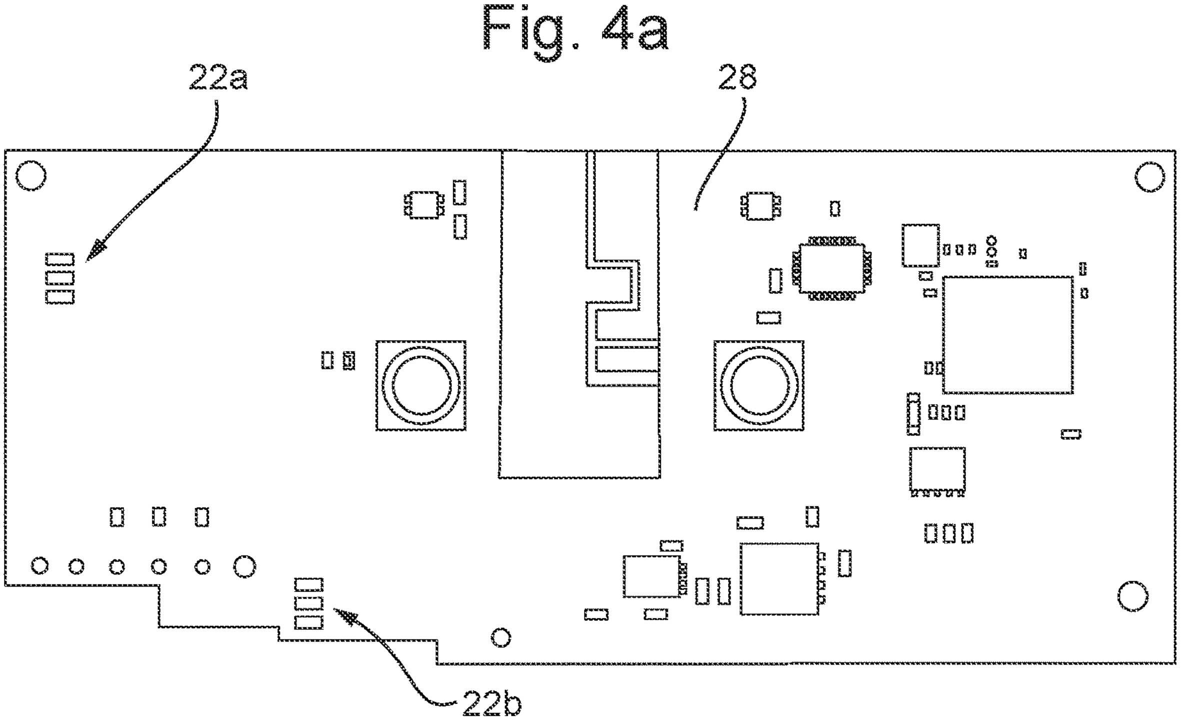
FIGS. 4*a* and 4*b* collectively FIG. 4) are front and back views respectively of a printed circuit board for an electrical socket according to an example of the present disclosure.
Figure 4B:
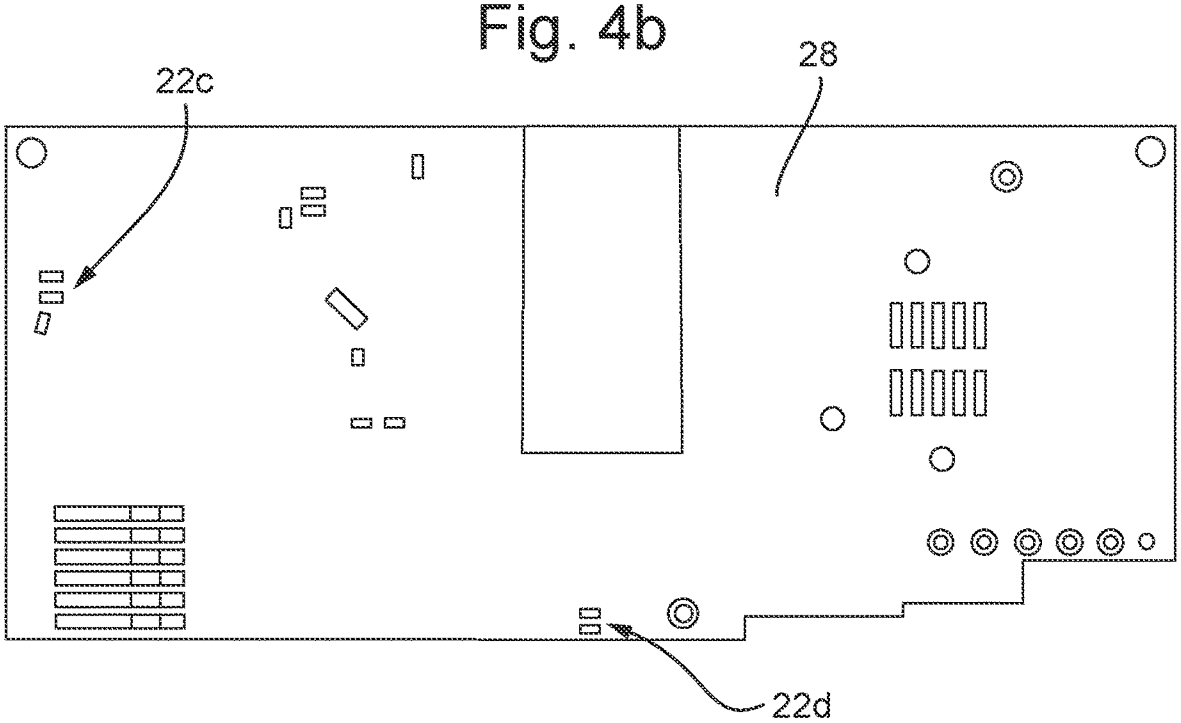

With reference to FIGS. 2, 3 and 4, the or each electrical socket 20 may comprise at least two temperature sensors 22*a*-22*d*. In the particular example shown, the electrical socket 20 comprises four temperature sensors 22*a*-22*d*. The temperature sensors 22*a*-22*d* may be mounted on a printed circuit board 28 of the electrical socket 20. (The controller 60 may be provided on or may be operatively coupled to the printed circuit board 28.) The temperature sensors 22*a*-22*d* may be distributed around the printed circuit board 28, e.g. at or near points within the electrical socket 20 where electrical arcing may occur. The temperature sensors 22*a*-22*d* may be provided on one or both sides of the printed circuit board 28. For example, first and second temperature sensors 22*a*, 22*b* may be provided on a first side of the printed circuit board and third and fourth temperature sensors 22*c*, 22*d* may be provided on a second side of the printed circuit board.

Having multiple temperature sensors 22*a*-22*d* may provide a degree of redundancy, e.g. in case one of the temperature sensors fails. Multiple temperature sensors 22*a*-22*d* may also allow electrical arcing in a particular region of the electrical socket 20 to be detected. Furthermore, the multiple temperature sensors 22*a*-22*d* may provide verification of the sensed data. For example, having at least three temperature sensors may allow the system to identify a faulty temperature sensor, which might otherwise have caused a false positive determination.

Figure 5:
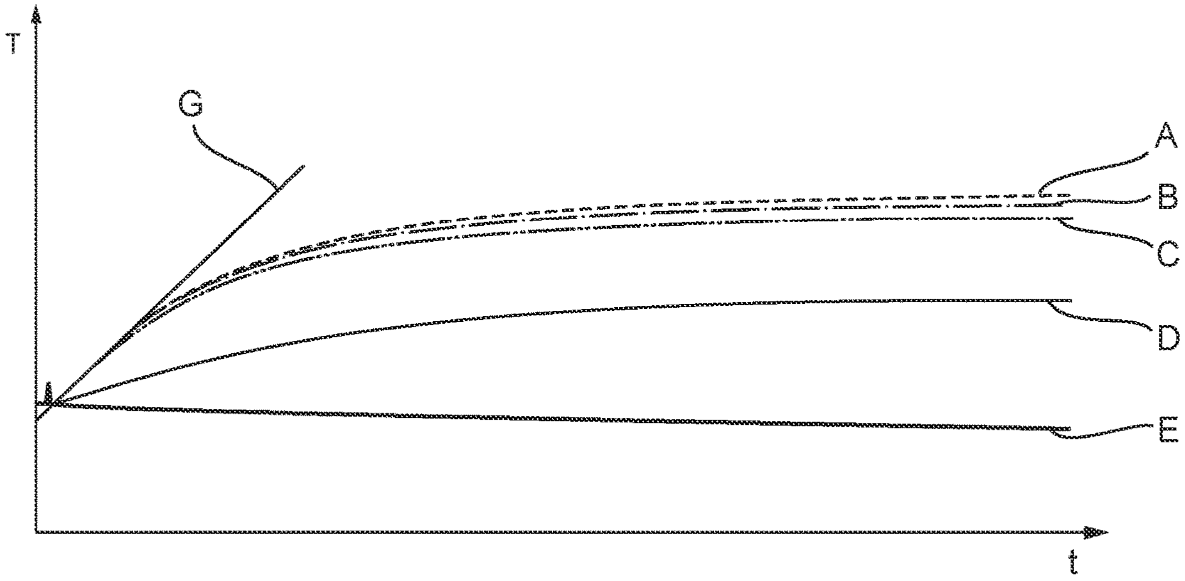
FIG. 5 is a graph depicting the variation of temperature (T) with time (t) according to an example of the present disclosure.

With reference to FIG. 5, the controller 60 is configured to determine a temperature gradient G of the temperature T with respect to time t. The controller 60 may take periodic temperature readings from the temperature sensors 22*a*-22*d* (e.g. at a frequency between 1 and 100 Hz) and may calculate the temperature gradient G with respect to time t. The controller 60 may comprise (or receive time data from) an electronic clock, which may be provided on or external to the controller, to assist in the calculation of the gradient. Alternatively, the controller 60 may obtain temperature data at a known frequency from which the time interval and thus gradient G can be deduced. The temperature gradient G may be calculated with reference to the temperature at a previous time, e.g. in a stepwise fashion, or by fitting a curve to the temperature values and estimating the temperature gradient.

FIG. 5 shows the variation of temperature T with time t for a number of scenarios A-E. Scenarios A-D depict normal functioning of the electrical socket 20 and as shown the temperature T initially rises and then levels off. The power usage in scenarios A-C may be higher than that in scenario D, which may cause the lower ultimate temperature in scenario D. In scenario E, there is a sharp spike in the temperature T, which may be caused by electrical arcing. In each case, the gradient G is determined and compared to the threshold gradient value. In the case of scenario E, the spike in temperature T may exceed the threshold gradient value.

The controller 60 may determine if the temperature gradient at a particular time exceeds a threshold gradient value. If the temperature gradient exceeds the threshold gradient value, the controller 60 may trigger an alarm event. The alarm event may comprise emitting a warning sound and/or light, e.g. via the light and/or sound emitting devices 24, 26 or any other warning device. The controller 60 may trigger the alarm event such that the warning devices of a particular one of the electrical sockets 20 (e.g. that has the temperature gradient G exceeding the threshold gradient value) may emit the warning. Alternatively, the controller 60 may trigger the alarm such that all electrical sockets 20 (e.g. within a building or a particular zone) may emit the warning. The building management system 40 may indicate to a user which of the electrical sockets 20 caused the alarm event.

The temperature within the electrical socket 20 is likely to quickly rise when an arcing event occurs. Thus, by monitoring the temperature gradient G and triggering an alarm event when the gradient exceeds the threshold value, the electrical socket system 10 can more quickly determine if an arcing event has occurred in the electrical socket 20.

In an example in which the controller 60 is operatively coupled to more than one electrical socket 20, the controller 60 may monitor the temperature and temperature gradient of each electrical socket 20. The controller 60 may determine if one of the electrical sockets 20 has a temperature gradient that exceeds the threshold gradient value, e.g. for that particular electrical socket 20. The threshold gradient value may be different for different electrical sockets 20.

The threshold gradient value may have a default value. However, this may be subsequently varied. For example, the default threshold gradient value may be varied after installation of the electrical socket 20, e.g. depending on at least one sensed environmental and/or electrical parameter.

In particular, the electrical socket 20 may be configured to measure at least one electrical power parameter. The controller 60 may be configured to receive data relating to the electrical power parameters. The at least one electrical power parameter may comprise at least one of electrical power, current, frequency and power factor. The threshold gradient value may vary depending on at least one of the electrical power parameters. For example, the controller 60 may be configured to increase the threshold gradient value for the electrical socket 20 if the electrical socket has a power usage that exceeds a threshold power value. Similarly, the controller 60 may be configured to decrease the threshold gradient value for the electrical socket 20 if the electrical socket has a power usage that is less than a threshold power value.

The power usage data may comprise present data that reflects the power usage at that moment in time. Additionally or alternatively, the power usage data may comprise historical power usage data and such historical data may be analysed and used to set an appropriate threshold gradient value. Furthermore, the power usage data may relate to a particular electrical socket 20 and the threshold gradient value may be set for that particular electrical socket. As such, each electrical socket 20 may have its own threshold gradient value.

In addition to or instead of the power usage data, the controller 60 may receive data relating to ambient atmospheric conditions, such as temperature, pressure, humidity and/or any other ambient parameter. The ambient conditions may relate to atmospheric conditions for the electrical socket, which may be within a room or outside a building. At least one ambient condition sensor may detect one or more of the ambient conditions and send the data to the controller 60, e.g. via the hub 30, cloud 50 and/or building management system 40. The ambient condition sensor(s) may be provided on the electrical socket 20 or they may be separate from the electrical socket 20. Alternatively, no ambient condition sensors may be provided and ambient condition data may be provided by an external source, such as an online weather data provider. The controller 60 may adjust the threshold gradient value depending on the ambient conditions data. For example, if the atmosphere has a high level of humidity, the threshold temperature gradient may be reduced. Electrical arcing may be more likely to occur in a humid atmosphere and it may be desirable to increase the sensitivity of the controller.

The controller 60 may comprise a machine learning (or artificial intelligence) algorithm. The machine learning algorithm may be configured to adjust the threshold gradient value for the electrical socket 20 (e.g. a particular electrical socket of a plurality of electrical sockets) based on at least one detected electrical power parameter of the electrical socket, data relating to ambient conditions and/or time of day. For example, the machine learning algorithm may use time of day data, e.g. to determine that power usage is typically high for a particular electrical socket 20 at a particular time of day. The machine learning algorithm may adjust (e.g. increase) the threshold gradient value for the particular electrical socket 20 at the particular time of day when power usage is known to be high. At other times, the threshold gradient value may be reduced. This may reduce the likelihood of false positive determinations, but maintain sensitivity at other times.

The machine learning algorithm may be configured to minimise false determinations of an alarm event. The machine learning algorithm may receive data regarding false positives so that the machine learning algorithm may adjust the threshold gradient values to minimise false positives.

Figure 6:
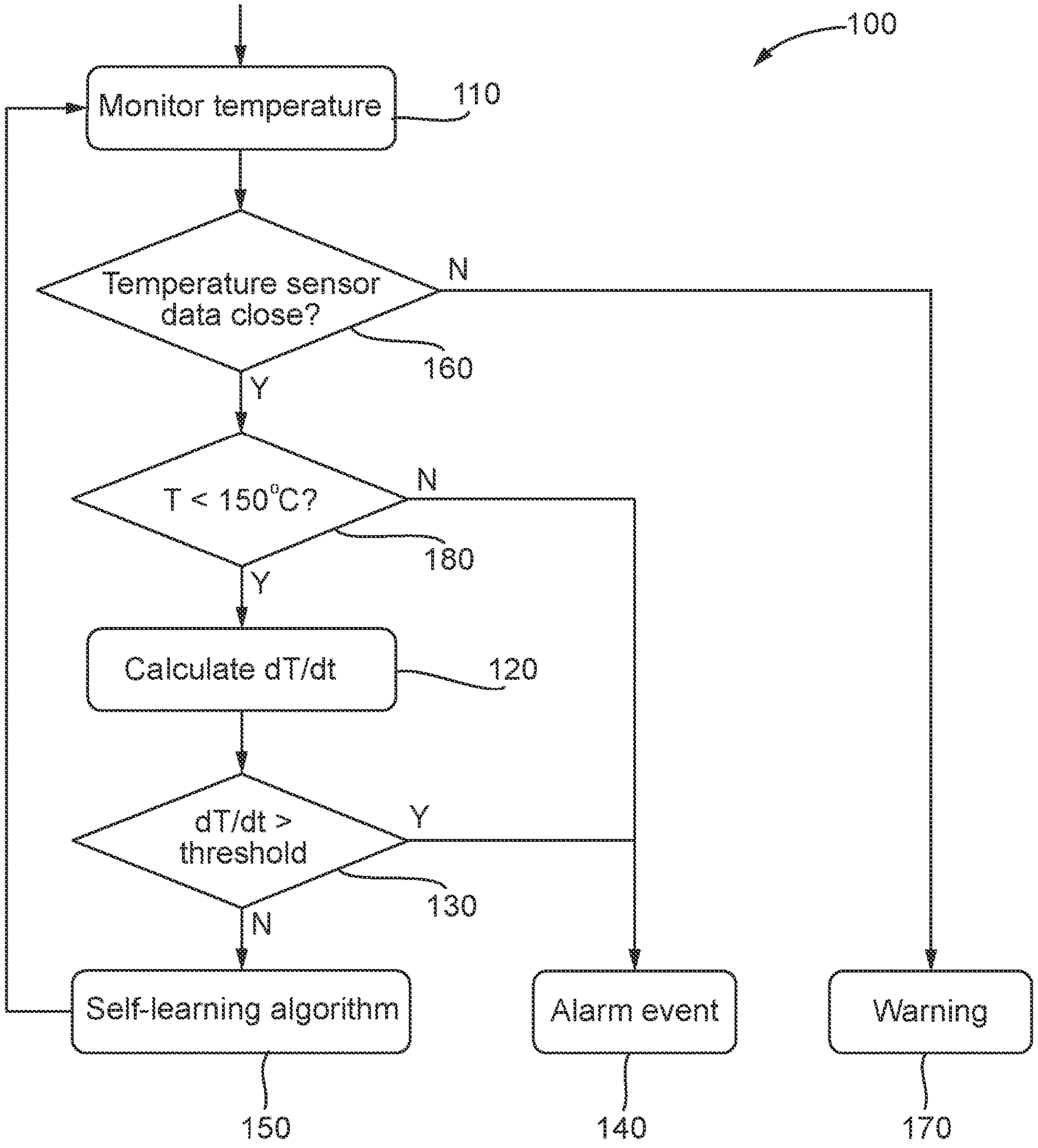
FIG. 6 is a flowchart depicting a method according to an example of the present disclosure.

With reference to FIG. 6, the present disclosure relates to a method 100 for the electrical socket 20. The method comprises a first block 110 in which the temperature of the or each electrical socket 20 is monitored by the temperature sensor 22*a*-22*d*. In a second block 120 the temperature gradient (dT/dt) of the temperature with respect to time is determined. In a third block 130 it is determined if the temperature gradient exceeds the threshold gradient value. In a fourth block 140, an alarm event is triggered if it is determined that the temperature gradient exceeds the threshold gradient value. The alarm event may indicate that the electrical socket may be on fire.

The method 100 may further comprise a fifth block 150 in which a machine learning algorithm is applied. The machine learning algorithm may adjust the threshold gradient value for the electrical socket based on the time of day, at least one detected electrical power parameter of the electrical socket and/or data relating to ambient conditions. The machine learning algorithm may be applied if the determination in the fourth block 140 is negative, i.e. the temperature gradient is less than the threshold gradient value.

In a sixth block 160, which may be carried out between the first and second blocks 110, 120, the data from multiple temperature sensors 22*a*-22*d* of a particular electrical socket 20 may be compared to one another. If one or more of the temperature sensors 22*a*-22*d* disagrees with others of the temperature sensors, then a warning may be emitted in a seventh block 170. The method 100 may otherwise continue, e.g. for other ones of the electrical sockets 20.

In an eight block 180, which may be carried out between the first and second blocks 110, 120, the data from the temperature sensors 22*a*-22*d* of a particular electrical socket 20 may be compared to an absolute threshold temperature value, e.g. 150 degrees C. If the temperature exceeds this value, then the method may proceed to the fourth block 140 in which the alarm event is triggered. The method may otherwise proceed to the second block 120 in which the temperature gradient is calculated.

As mentioned above, the method 100 may further comprise adjusting the threshold gradient value based on power usage data for the electrical socket and/or data relating to ambient conditions.

The present disclosure may also relate to a method of commissioning the electrical socket system 10. The electrical socket system 10 may be a new installation or electrical sockets 20 may be retrofitted into an existing electrical system. During commissioning, the mobile device 45 may communicate directly with the electrical socket 20 and/or hub 30. For example, the mobile device 45 may wirelessly communicate with the electrical socket 20 and/or hub 30, e.g. via Bluetooth. The electrical socket 20 and/or hub 30 may be configured to communicate with the mobile device 45 and receive data from the mobile device 45.

The mobile device 45 may assist with the commissioning process. For example, the mobile device 45 may assist with pairing the hub 30 and electrical socket 20 to one another. The mobile device 45 may connect to the electrical socket 20. A user may then select a particular hub 30 for the electrical socket 20 to pair with. The mobile device 45 may display a list of available hubs for the user to select. The electrical socket 20 and particular hub 30 may then be paired together, e.g. via the wired or wireless means mentioned above.

In addition, the mobile device 45 may connect to the electrical socket 20 and/or hub 30 to provide installation data to the electrical socket 20 and/or hub 30. Such installation data may comprise the identity of the electrical socket 20, a location of the electrical socket 20 (e.g. room, zone etc.), likely use of electrical socket 20 and/or any other pertinent data relating to the electrical socket 20. The installation data may then be stored on the hub 30, electrical socket 20, cloud server 50, BMS 40 and/or any other device. The electrical socket 20 may be identified with an identifier, such as a number, barcode, QR code or any other indicia. For example, the mobile device 45 may comprise a camera or other such scanning device to capture the identifier. The mobile device 45 may then send the identifier (along with any other installation data if provided) to the electrical socket 20 and/or hub 30. The mobile device 45 may have an application (or "app") stored thereon to provide the functionality described above.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An electrical socket system comprising:

an electrical socket comprising at least one temperature sensor; and a controller configured to monitor a temperature sensed by the temperature sensor, wherein the controller is configured to:

determine a temperature gradient of the temperature with respect to time;

determine if the temperature gradient exceeds a threshold gradient value;

receive power usage data for the electrical socket;

adjust the threshold gradient value for the electrical socket depending on the power usage data for the electrical socket; and trigger an alarm event if it is determined that the temperature gradient exceeds the threshold gradient value.

2. The electrical socket system of claim 1, wherein the threshold gradient value is variable.

3. The electrical socket system of claim 1, wherein the controller is configured to increase the threshold gradient value for the electrical socket if the electrical socket has a power usage that exceeds a threshold power value.

4. The electrical socket system of claim 1, wherein the controller is configured to receive data relating to ambient conditions and the controller is configured to adjust the threshold gradient value depending on the data relating to ambient conditions.

5. The electrical socket system of claim 1, wherein the controller comprises a machine learning algorithm that is configured to adjust the threshold gradient value for the electrical socket based on at least one detected electrical power parameter of the electrical socket and/or data relating to ambient conditions.

6. The electrical socket system of claim 1, wherein the electrical socket is configured to measure at least one electrical power parameter.

7. The electrical socket system of claim 6, wherein the at least one electrical power parameter comprises at least one of electrical power, current, frequency and power factor.

8. The electrical socket system of claim 6, wherein the threshold gradient value varies depending on at least one of the electrical power parameters.

9. The electrical socket system of claim 1, wherein the electrical socket system comprises a plurality of electrical sockets.

10. The electrical socket system of claim 1, wherein the electrical socket comprises at least three temperature sensors.

11. The electrical socket system of claim 1, wherein the temperature sensors are mounted on a printed circuit board of the electrical socket.

12. The electrical socket system of claim 1, wherein the electrical socket and controller are coupled together.

13. The electrical socket system of claim 1, wherein the controller is separate from the electrical socket.

14. The electrical socket system of claim 1, wherein the electrical socket comprises at least one warning device configured to emit a warning sound and/or light when it is determined that the temperature gradient exceeds the threshold gradient value.

15. An electrical socket system comprising:

an electrical socket comprising temperature sensors, wherein the temperature sensors are located at or near known arc points;

a controller configured to monitor a temperature sensed by the temperature sensor, wherein the controller is configured to:

determine a temperature gradient of the temperature with respect to time;

determine if the temperature gradient exceeds a threshold gradient value;

trigger an alarm event if it is determined that the temperature gradient exceeds the threshold gradient value.

16. An electrical socket system comprising:

an electrical socket comprising at least one temperature sensor;

a controller configured to monitor a temperature sensed by the temperature sensor, wherein the controller is configured to:

determine a temperature gradient of the temperature with respect to time;

determine if the temperature gradient exceeds a threshold gradient value;

trigger an alarm event if it is determined that the temperature gradient exceeds the threshold gradient value; and wherein the electrical socket system comprises a plurality of electrical sockets and each electrical socket is operatively coupled to a hub.

17. The electrical socket system of claim 16, wherein the hub comprises the controller.

18. The electrical socket system of claim 16, wherein the hub forms part of or is operatively coupled to a building management system.

19. The electrical socket system of claim 18, wherein the building management system comprises the controller.

20. A method for an electrical socket comprising at least one temperature sensor, the method comprising monitoring a temperature sensed by the temperature sensor;

determining a temperature gradient of the temperature with respect to time;

determining if the temperature gradient exceeds a threshold gradient value;

adjusting the threshold gradient value depending on data relating to ambient conditions; and triggering an alarm event if it is determined that the temperature gradient exceeds the threshold gradient value.

21. The method of claim 20, wherein the method further comprises:

adjusting the threshold gradient value based on power usage data for the electrical socket.

22. A method for an electrical socket comprising at least one temperature sensor, the method comprising monitoring a temperature sensed by the temperature sensor;

determining a temperature gradient of the temperature with respect to time;

determining if the temperature gradient exceeds a threshold gradient value;

applying a machine learning algorithm to adjust the threshold gradient value for the electrical socket based on at least one detected electrical power parameter of the electrical socket and/or data relating to ambient conditions; and triggering an alarm event if it is determined that the temperature gradient exceeds the threshold gradient value.

* * * * *